United States Patent
Song et al.

(10) Patent No.: US 9,979,023 B2
(45) Date of Patent: May 22, 2018

(54) POSITIVE ACTIVE MATERIAL AND RECHARGEABLE LITHIUM BATTERY INCLUDING SAME

(75) Inventors: Jay-Hyok Song, Yongin-si (KR);
Sang-In Park, Yongin-si (KR);
Ji-Hyun Kim, Yongin-si (KR);
Ki-Hyun Kim, Yongin-si (KR);
Yong-Chan You, Yongin-si (KR);
Ha-Young Lee, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 943 days.

(21) Appl. No.: 13/602,033

(22) Filed: Aug. 31, 2012

(65) Prior Publication Data
US 2013/0316240 A1    Nov. 28, 2013

(30) Foreign Application Priority Data
May 23, 2012   (KR) .................. 10-2012-0054905

(51) Int. Cl.
*H01M 4/58*      (2010.01)
*C01B 25/45*     (2006.01)
*H01M 10/0525*   (2010.01)
*H01M 4/02*      (2006.01)

(52) U.S. Cl.
CPC .......... *H01M 4/5825* (2013.01); *C01B 25/45* (2013.01); *H01M 10/0525* (2013.01); *H01M 2004/021* (2013.01)

(58) Field of Classification Search
CPC .......... H01M 4/5825; H01M 10/0525; H01M 2004/021; C01B 25/45
See application file for complete search history.

(56) References Cited

U.S. PATENT DOCUMENTS

| | | |
|---|---|---|
| 7,390,472 B1 | 6/2008 | Singhal et al. |
| 2004/0111873 A1 | 6/2004 | Okawa et al. |
| 2004/0151649 A1 | 8/2004 | Hemmer et al. |
| 2008/0008938 A1 | 1/2008 | Wu et al. |
| 2008/0308773 A1 | 12/2008 | Liaw et al. |
| 2009/0136850 A1 | 5/2009 | Yoon et al. |
| 2010/0148114 A1 | 6/2010 | Iizuka et al. |
| 2010/0233540 A1* | 9/2010 | Choy et al. .................. 429/220 |
| 2011/0052988 A1* | 3/2011 | Beck et al. .................. 429/221 |

(Continued)

FOREIGN PATENT DOCUMENTS

| | | |
|---|---|---|
| CN | 101859891 A | 10/2010 |
| DE | 10117904 A1 | 10/2002 |

(Continued)

OTHER PUBLICATIONS

Extended European Search Report, dated Sep. 3, 2013, for Application No. 13153629.4, 5 pages.

(Continued)

*Primary Examiner* — Eugenia Wang
(74) *Attorney, Agent, or Firm* — Lewis Roca Rothgerber Christie LLP

(57) ABSTRACT

The present invention provides a positive active material including a lithium-containing compound represented by the following Chemical Formula 1 and a rechargeable lithium battery including the positive active material.

$LiFe_{1-x-z}M_xM'_zP_yO_4$.     Chemical Formula 1

12 Claims, 1 Drawing Sheet

(56) References Cited

U.S. PATENT DOCUMENTS

| | | | |
|---|---|---|---|
| 2011/0297875 A1 | 12/2011 | Yang et al. | |
| 2011/0297895 A1 | 12/2011 | Yang et al. | |
| 2011/0300446 A1 | 12/2011 | Yang et al. | |
| 2012/0183839 A1 | 7/2012 | Yuasa et al. | |
| 2013/0143118 A1* | 6/2013 | Harada et al. | 429/220 |

FOREIGN PATENT DOCUMENTS

| | | |
|---|---|---|
| JP | 2004-63422 A | 2/2004 |
| JP | 2010-86657 A | 4/2010 |
| JP | 2010-86658 A | 4/2010 |
| JP | 2011-76820 A | 4/2011 |
| KR | 10-2004-0011498 | 2/2004 |
| KR | 10-2004-0080932 | 9/2004 |
| KR | 10-2008-0047537 | 5/2008 |
| KR | 10-2009-0054636 | 6/2009 |
| KR | 10-2010-0044713 | 4/2010 |

OTHER PUBLICATIONS

SIPO Office Action, with English translation, dated May 2, 2017, for corresponding Chinese Patent Application No. 201310052147.0 (12 pages).

Yang et al., "The Doping Effect on the Electrochemical Properties of $LiFe_{0.95}M_{0.05}PO_4$ ($M=Mg^{2+}$, $Ni^{2+}$, $Al^{3+}$, or $V^{3+}$) as Cathode Materials for Lithium-Ion Cells," Journal of the Electrochemical Society, vol. 155, No. 10, 2008, pp. A729-A732.

SIPO Notification of Reexamination dated Mar. 22, 2018, with English translation, of the corresponding Chinese Patent Application No. 201310052147.0 (10 pages).

* cited by examiner

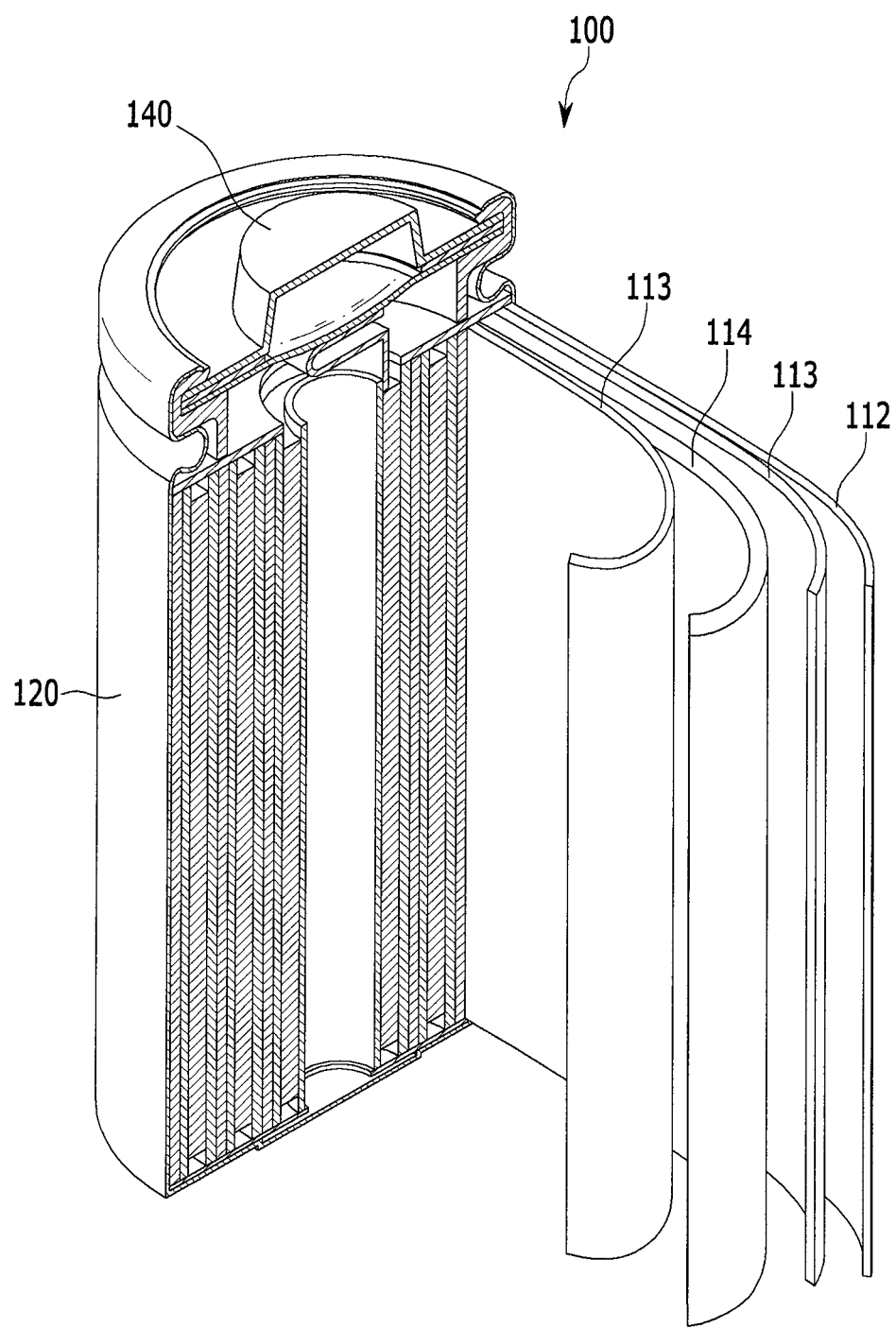

POSITIVE ACTIVE MATERIAL AND RECHARGEABLE LITHIUM BATTERY INCLUDING SAME

CROSS-REFERENCE TO RELATED APPLICATION

This application claims priority to and the benefit of Korean Patent Application No. 10-2012-0054905 filed in the Korean Intellectual Property Office on May 23, 2012, the entire contents of which are incorporated herein by reference.

BACKGROUND

1. Field

A positive active material and a rechargeable lithium battery including the same are disclosed.

2. Description of the Related Art

Batteries convert chemical energy generated from an electrochemical redox reaction of chemical material in a battery into electrical energy. Such batteries can be classified into a primary battery, which is generally disposed after the energy inside the battery is consumed, and a rechargeable battery, which can be recharged several times.

A rechargeable battery can be charged/discharged several times as a result of the reversible transformation between chemical energy and electrical energy. Recent developments in the high-tech electronics industry has allowed electronic devices to become small and light weight, which has led to an increase in portable electronic devices. As a power source for such portable electronic devices, the demand for batteries with high energy density is increasing and much research has been directed to developing lithium rechargeable batteries.

A rechargeable lithium battery is manufactured by injecting an electrolyte into a battery cell, which includes a positive electrode including a positive active material capable of intercalating/deintercalating lithium ions and a negative electrode including a negative active material capable of intercalating/deintercalating lithium ions. The positive active material includes a lithium-containing compound capable of reversibly intercalating and deintercalating lithium, for example, a lithium cobalt oxide, a lithium manganese oxide, a lithium nickel compound, or the like. Recently, $LiFePO_4$, having an olivine structure, has been researched as a positive active material. $LiFePO_4$ is chemically stable, and thus is less likely to explode, and is relatively less expensive than other positive active materials. However, $LiFePO_4$ has relatively low ion conductivity and thus, may have decreased capacity when current per unit time is increased.

SUMMARY

Aspects of embodiments of the present invention are directed to a positive active material that is chemically stable and has improved capacity characteristics. According to one embodiment, a positive active material includes a lithium-containing compound represented by the following Chemical Formula 1:

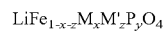     Chemical Formula 1

In Chemical Formula 1, M may be vanadium (V), M' may be cobalt (Co), manganese (Mn), magnesium (Mg), zirconium (Zr), nickel (Ni), or a combination thereof, and about $0<x<$about 0.20, about $0\leq z<$about 0.20, and about $0.90\leq y<$about 1.20.

In some embodiments, x and y have a ratio of about $0.009\leq x/y\leq$about 0.09. In some embodiments, x and y have a ratio of about $0.03\leq x/y\leq$about 0.07. In some embodiments, x and y have an x/y ratio of about 0.05.

In some embodiments, x and z have a ratio of about $0.5\leq x/z\leq$about 5. In some embodiments, x and z have an x/z ratio of about 2.

In some embodiments, M is vanadium (V) and M' is cobalt (Co).

In some embodiments, the lithium-containing compound is one or more of $LiFe_{0.99}V_{0.01}PO_4$, $LiFe_{0.99}V_{0.01}P_{1.03}O_4$, $LiFe_{0.97}V_{0.03}PO_4$, $LiFe_{0.95}V_{0.05}PO_4$, $LiFe_{0.95}V_{0.05}P_{1.03}O_4$, $LiFe_{0.95}V_{0.05}P_{1.06}O_4$, $LiFe_{0.93}V_{0.7}PO_4$, $LiFe_{0.91}V_{0.09}PO_4$, $LiFe_{0.91}V_{0.09}P_{1.03}O_4$, $LiFe_{0.91}V_{0.09}P_{1.06}O_4$, $LiFe_{0.96}V_{0.05}Co_{0.01}PO_4$, $LiFe_{0.925}V_{0.05}Co_{0.025}PO_4$, or $LiFe_{0.9}V_{0.05}CO_{0.05}PO_4$.

The lithium-containing compound may have a primary particle size in a range of about 50 nm to about 1000 nm. In some embodiments, the lithium-containing compound has a primary particle size in a range of about 50 nm to about 200 nm. The primary particles of the lithium-containing compound may be agglomerated, and the agglomerated particles may have a size in the range of about 5 μm to about 30 μm.

In some embodiments, a rechargeable lithium battery includes a positive electrode including the positive active material described above, a negative electrode, and an electrolyte.

Accordingly, aspects of embodiments of the present invention are directed to a positive active material that is chemically stable and has improved capacity and cycle-life characteristics.

BRIEF DESCRIPTION OF THE DRAWING

The drawing is a schematic view of a lithium secondary battery according to one embodiment.

DETAILED DESCRIPTION

Exemplary embodiments of the present invention will hereinafter be described in detail. However, these embodiments are only exemplary, and the present invention is not limited thereto.

The positive active material according to one embodiment includes a compound being capable of reversibly intercalating and deintercalating lithium, that is, a lithium-containing compound represented by the following Chemical Formula 1.

     Chemical Formula 1

In Chemical Formula 1, M is vanadium (V), M' is cobalt (Co), manganese (Mn), magnesium (Mg), zirconium (Zr), nickel (Ni), or a combination thereof, and about $0<x<$about 0.20, about $0\leq z<$about 0.20, and about $0.90\leq y<$about 1.20.

The lithium-containing compound represented by the above Chemical Formula 1 is an olivine-structured compound including lithium, iron, and phosphate, where a part of iron (Fe) is substituted with other metals, i.e., a first metal (M) and a second metal (M').

The first metal (M) is a metal capable of improving rate capability. For example, in some embodiments, M is vanadium (V).

The second metal (M') is a metal capable of improving cycle-life characteristics. For example, in some embodiments, M' is one of cobalt (Co), manganese (Mn), magnesium (Mg), zirconium (Zr), nickel (Ni), or a combination thereof.

In some embodiments, the lithium-containing compound is one or more of $LiFe_{0.99}V_{0.01}PO_4$, $LiFe_{0.99}V_{0.01}P_{1.03}O_4$, $LiFe_{0.97}V_{0.03}PO_4$, $LiFe_{0.95}V_{0.05}PO_4$, $LiFe_{0.95}V_{0.05}P_{1.03}O_4$, $LiFe_{0.95}V_{0.05}P_{1.06}O_4$, $LiFe_{0.93}V_{0.7}PO_4$, $LiFe_{0.91}V_{0.09}PO_4$, $LiFe_{0.91}V_{0.09}P_{1.03}O_4$, $LiFe_{0.91}V_{0.09}P_{1.06}O_4$, $LiFe_{0.96}V_{0.05}CO_{0.01}PO_4$, $LiFe_{0.925}V_{0.05}Co_{0.025}PO_4$, or $LiFe_{0.9}V_{0.05}Co_{0.05}PO_4$.

Herein, the first metal (M) and phosphorus (P), that is, x and y, may be included at a ratio of about $0.009 \leq x/y \leq$ about 0.09. In some embodiments, x and y may be included at a ratio of about $0.03 \leq x/y \leq$ about 0.07. In still other embodiments, x and y may be included at an x/y ratio of about 0.05. When the first metal (M) and phosphorus (P) are included at a ratio within the above described range, capacity characteristics may be improved.

In addition, the first metal (M) and the second metal (M'), that is, x and z may be included at a ratio of about $0 < x/z <$ about 100. In some embodiments, x and z may be included at a ratio of about $1 \leq x/z \leq$ about 5. In still other embodiments, x and z may be included at an x/z ratio of about 2. When the first metal (M) and the second metal (M') are included at a ratio within the above described range, cycle-life characteristics may be improved.

The positive active material may be prepared by mixing a Lithium (Li) raw material, an iron (Fe) raw material, a first metal (M) raw material, a second metal (M') raw material, and a phosphate ($PO_4$) raw material and firing the mixture at a temperature in a range of about 650° C. to about 850° C.

The lithium (Li) raw material may include, for example, lithium phosphate ($Li_3PO_4$), lithium nitrate ($LiNO_3$), lithium acetate ($LiCH_3COOH$), lithium carbonate ($Li_2CO_3$), lithium hydroxide (LiOH), lithium dihydrogen phosphate ($LiH_2PO_4$), or a combination thereof, but the Li raw material is not limited thereto.

The iron (Fe) raw material may include, for example, $F_2C_2O_4\text{-}2H_2O$, $FePO_4$, $Fe_3(PO_4)_2\text{-}8H_2O$, or a combination thereof, but the Fe raw material is not limited thereto.

The first metal (M) raw material and the second metal (M') raw material may each include a sulfide, a nitride, an acetate, a hydroxide, a chloride, an oxalate, a fluoride, a carbonate, or a combination thereof that respectively include the first metal (M) or the second metal (M'), but the first and second metal raw materials are not limited thereto.

The phosphate ($PO_4$) raw material may include phosphoric acid ($H_3PO_4$), dibasic ammonium phosphate (($NH_4$)$_2HPO_4$), ammonium phosphate trihydrate (($NH_4$)$_3PO_4\cdot3H_2O$), metaphosphoric acid, orthophosphoric acid, monoammonium phosphate ($NH_4H_2PO_4$), or a combination thereof, but the phosphate raw material is not limited thereto.

The positive active material may have a primary particle size in a range of about 50 nm to about 1000 nm. In some embodiments, the positive active material may have a primary particle size in the range of about 50 nm to about 200 nm. The positive active material is ground in an aqueous system and then dried and fired, forming a secondary particle consisting of the primary particles. The secondary particle may have a size in the range of, for example, about 5 μm to about 30 μm.

Hereinafter, a rechargeable lithium battery including the aforementioned positive active material will be described with reference to the drawing. The drawing is a schematic view of a lithium secondary battery according to one embodiment.

Referring to FIG. 1, the rechargeable lithium battery 100 according to one embodiment includes a battery cell including a positive electrode 114, a negative electrode 112 facing the positive electrode 114, and a separator 113 interposed between the positive electrode 114 and negative electrode 112. An electrolyte (not shown) impregnates the positive electrode 114, negative electrode 112, and separator 113. A battery case 120 includes the battery cell, and a sealing member 140 seals the battery case 120.

The positive electrode 114 includes a current collector and a positive active material layer formed on at least one surface of the current collector.

The current collector may include aluminum foil, but it is not limited thereto.

The positive active material layer includes the positive active material described above, a binder, and a conductive material.

The binder improves binding properties of the positive active material particles to one another, and of the positive active material to the current collector. Examples of the binder include polyvinyl alcohol, carboxymethylcellulose, hydroxypropylcellulose, diacetylcellulose, polyvinylchloride, carboxylated polyvinylchloride, polyvinylfluoride, an ethylene oxide-containing polymer, polyvinylpyrrolidone, polyurethane, polytetrafluoroethylene, polyvinylidenefluoride, polyethylene, polypropylene, a styrene-butadiene rubber, an acrylated styrene-butadiene rubber, an epoxy resin, nylon, and the like, but the binder is not limited thereto.

The conductive material is included to improve electrode conductivity. Any electrically conductive material may be used as a conductive material unless it causes a chemical change. Examples of the conductive material include a carbon-based material such as natural graphite, artificial graphite, carbon black, acetylene black, Ketjen black, a carbon fiber, or the like; a metal-based material of metal powder or metal fiber including copper, nickel, aluminum, silver, or the like; a conductive polymer material such as a polyphenylene derivative; and a mixture thereof.

The positive electrode 114 may be fabricated by mixing the positive active material, binder, and conductive material in a solvent to prepare positive active material slurry, and coating the positive active material slurry on the current collector. The solvent includes N-methylpyrrolidone or the like, but it is not limited thereto. Positive electrode-fabricating methods are known to those skilled in the art.

The negative electrode 112 may include a current collector and a negative active material layer formed on at least one surface of the current collector.

The current collector may be selected from a copper foil, a nickel foil, a stainless steel foil, a titanium foil, a nickel foam, a copper foam, a polymer substrate coated with a conductive metal, or combinations thereof.

The negative active material layer includes a negative active material, a binder, and optionally, a conductive material.

The negative active material layer includes at least one of a material that reversibly intercalates/deintercalates lithium ions, a lithium metal, a lithium metal alloy, a material being capable of doping and dedoping lithium, or a transition metal oxide.

The material that reversibly intercalates/deintercalates lithium ions includes a carbonaceous material. The carbonaceous material may be any carbon-based negative active material that is generally used in a lithium ion rechargeable battery. Examples of the carbonaceous material include crystalline carbon, amorphous carbon, and mixtures thereof. The crystalline carbon may be non-shaped or sheet, flake, spherical, or fiber shaped natural graphite or artificial graphite. The amorphous carbon may be a soft carbon, a hard carbon, mesophase pitch carbide, fired coke, or the like.

Of these carbonaceous materials, it is desirable to use graphite as the negative active material.

Examples of the lithium metal alloy include lithium and a metal selected from Na, K, Rb, Cs, Fr, Be, Mg, Ca, Sr, Si, Sb, Pb, In, Zn, Ba, Ra, Ge, Al, and Sn.

Examples of the material being capable of doping and dedoping lithium include Si, $SiO_x$ (0<x<2), a Si-Q alloy (wherein Q is not Si and is an element selected from an alkali metal, an alkaline-earth metal, a group 13 element, a group 14 element, a transition element, a rare earth element, and/or a combination thereof), Sn, $SnO_2$, Sn—R (wherein R is not Sn and is an element selected from an alkali metal, an alkaline-earth metal, a group 13 element, a group 14 element, a transition element, a rare earth element, and/or a combination thereof), or mixtures thereof. At least one of these materials may be mixed with $SiO_2$. The elements Q and R may independently include at least one selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, or Po.

The binder improves the binding properties of the negative active material particles with one another and of the negative active materials with the current collector. The binder includes a non-water-soluble binder, a water-soluble binder, or a combination thereof.

Non-water-soluble binders include polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

Water-soluble binders include a styrene-butadiene rubber, an acrylated styrene-butadiene rubber, polyvinyl alcohol, sodium polyacrylate, a copolymer of propylene and a C2 to C8 olefin, a copolymer of (meth)acrylic acid and (meth) acrylic acid alkyl ester, or a combination thereof.

When the water-soluble binder is used as a negative electrode binder, a cellulose-based compound may also be included to provide viscosity. Cellulose-based compounds include one or more of carboxymethyl cellulose, hydroxypropylmethyl cellulose, methyl cellulose, or alkali metal salts thereof. The alkali metal may be Na, K, or Li. The cellulose-based compound may be included in an amount of about 0.1 to about 3 parts by weight based on 100 parts by weight of the negative active material.

The conductive material may be any electrically conductive material unless it causes a chemical change in the battery. Examples of the conductive material include carbon-based materials such as natural graphite, artificial graphite, carbon black, acetylene black, Ketjen black, carbon fibers, or the like; a metal-based material such as a metal powder or metal fiber including copper, nickel, aluminum, silver, or the like; a conductive polymer such as polyphenylene derivatives; and a mixture thereof.

The negative electrode may be fabricated by mixing the negative active material, binder, and conductive material in a solvent to prepare negative active material slurry. The negative active material slurry may then be coated on a current collector, dried, and pressed. The solvent includes N-methylpyrrolidone, water, or the like, but it is not limited thereto. Negative electrode-fabrication methods are known to those skilled in the art.

The electrolyte includes a non-aqueous organic solvent and a lithium salt.

The non-aqueous organic solvent transmits ions taking part in the electrochemical reaction of the battery.

The non-aqueous organic solvent may include a carbonate-based solvent, an ester-based solvent, an ether-based solvent, a ketone-based solvent, an alcohol-based solvent, or an aprotic solvent. Examples of the carbonate-based solvent include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. Examples of the ester-based solvent include methyl acetate, ethyl acetate, n-propyl acetate, dimethylacetate, methylpropionate, ethylpropionate, γ-butyrolactone, decanolide, valerolactone, mevalonolactone, caprolactone, and the like. Examples of the ether-based solvent include dibutyl ether, tetraglyme, diglyme, dimethoxyethane, 2-methyltetrahydrofuran, tetrahydrofuran, and the like. Examples of the ketone-based solvent include cyclohexanone and the like. Examples of the alcohol-based solvent include ethyl alcohol, isopropyl alcohol, and the like. Examples of the aprotic solvent include nitriles such as R—CN (where R is a C2 to C20 linear, branched, or cyclic hydrocarbon, that includes a double bond, an aromatic ring, or an ether bond), amides such as dimethylformamide, dioxolanes such as 1,3-dioxolane, sulfolanes, and the like.

A single organic solvent may be used or a mixture of organic solvents may be used. When mixtures of organic solvents are used, the mixture ratio may be controlled in accordance with the desired battery performance.

The carbonate-based solvent may include a mixture of a cyclic carbonate and a linear carbonate. The cyclic carbonate and linear carbonate may be mixed together in a volume ratio of about 1:1 to about 1:9. When the mixture is included in the electrolyte, the electrolyte may have enhanced performance.

In addition, the non-aqueous organic solvent may further include an aromatic hydrocarbon-based solvent in addition to the carbonate-based solvent. The carbonate-based solvent and aromatic hydrocarbon-based solvent may be mixed together in a volume ratio of about 1:1 to about 30:1.

The aromatic hydrocarbon-based organic solvent may be an aromatic hydrocarbon-based compound represented by the following Chemical Formula 2.

Chemical Formula 2

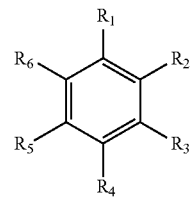

In Chemical Formula 2, $R_1$ to $R_6$ are independently selected from hydrogen, a halogen, a C1 to C10 alkyl group, a haloalkyl group, or a combination thereof.

The aromatic hydrocarbon-based organic solvent may include, but is not limited to, at least one selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The non-aqueous electrolyte may further include vinylene carbonate or an ethylene carbonate-based compound represented by the following Chemical Formula 3 in order to improve cycle life.

Chemical Formula 3

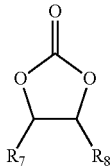

In Chemical Formula 3, $R_7$ and $R_8$ are the same or different and may be each independently be selected from hydrogen, a halogen, a cyano group (CN), a nitro group ($NO_2$), or a C1 to C5 fluoroalkyl group, provided that at least one of $R_7$ and $R_8$ is a halogen, a cyano group (CN), a nitro group ($NO_2$), or a C1 to C5 fluoroalkyl group, and $R_7$ and $R_8$ are not simultaneously hydrogen.

Examples of the ethylene carbonate-based compound include difluoro ethylenecarbonate, chloroethylene carbonate, dichloroethylene carbonate, bromoethylene carbonate, dibromoethylene carbonate, nitroethylene carbonate, cyanoethylene carbonate, or fluoroethylene carbonate. The amount of the additive for improving cycle life may be used within an appropriate range.

The lithium salt is dissolved in the organic solvent, supplies the battery with lithium ions, and improves transportation of the lithium ions between the positive and negative electrodes. Examples of the lithium salt include at least one salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers), LiCl, LiI, and $LiB(C_2O_4)_2$ (lithium bis(oxalato) borate; LiBOB). The lithium salt may be used in a concentration ranging from about 0.1 M to about 2.0 M. When the lithium salt is included at the above concentration range, an electrolyte may have optimal electrolyte conductivity and viscosity, and thus may have enhanced performance and effective lithium ion mobility.

The separator 113 may include any materials commonly used in conventional lithium batteries as long as it separates the negative electrode 112 from the positive electrode 114 and allows passage of lithium ions. In other words, suitable separators may have a low resistance to ion transport and an good electrolyte impregnation characteristics. For example, the separator may be selected from glass fiber, polyester, TEFLON (tetrafluoroethylne), polyethylene, polypropylene, polytetrafluoroethylene (PTFE), or a combination thereof. The separator may be a non-woven fabric or a woven fabric. For example, in the lithium ion battery, a polyolefin-based polymer separator such as polyethylene, polypropylene or the like may be used. In order to obtain heat resistance or mechanical strength, a coated separator may include a ceramic component or a polymer material. The separator may be a single layer or may have multi-layered structure.

In general, rechargeable lithium batteries may be classified as lithium ion batteries, lithium ion polymer batteries, or lithium polymer batteries according to the presence of a separator and the type of electrolyte used in the battery. Rechargeable lithium batteries may have a variety of shapes and sizes, such as cylindrical, prismatic, or coin-type, and may also be a thin film or bulk type. Structures and fabrication methods of lithium ion batteries are known to those skilled in the art.

The following examples illustrate the invention in more detail. These examples, however, are not in any sense to be interpreted as limiting the scope of the invention.

PREPARATION OF POSITIVE ACTIVE MATERIAL

Preparation Example 1-1

$Li_2Co_3$, $FeC_2O_4\text{-}2H_2O_2$, $NH_4VO_3$, and $(NH_4)_2HPO_4$ were mixed in water and processed with a ball mill. Herein, the $FeC_2O_4\text{-}2H_2O_2$, $NH_4VO_3$, and $(NH_4)_2HPO_4$ were mixed to have a Fe:V:$PO_4$ mole ratio in the raw materials of 0.99:0.01:1.00.

Next, the reactant was dried at 110° C. to remove the solvent remaining therein. Then, the reactant was heat treated at 750° C. for 10 hours under a reduction atmosphere, obtaining a positive active material having the following formula:

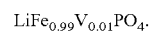

$LiFe_{0.99}V_{0.01}PO_4$.

Preparation Example 1-2

A positive active material having the following formula $LiFe_{0.99}V_{0.01}P_{1.03}O_4$ was prepared according to the same method as in Preparation Example 1-1 except that the raw materials were mixed to have a Fe:V:$PO_4$ mole ratio of 0.99:0.01:1.03.

Preparation Example 2-1

A positive active material having the following formula $LiFe_{0.97}V_{0.03}PO_4$ was prepared according to the same method as in Preparation Example 1-1 except that the raw materials were mixed to have a Fe:V:$PO_4$ mole ratio of 0.97:0.03:1.00.

Preparation Example 3-1

A positive active material having the following formula $LiFe_{0.95}V_{0.05}PO_4$ was prepared according to the same method as in Preparation Example 1-1 except that the raw materials were mixed to have a Fe:V:$PO_4$ mole ratio of 0.95:0.05:1.00.

Preparation Example 3-2

A positive active material having the following formula $LiFe_{0.95}V_{0.05}P_{1.03}O_4$ was prepared according to the same method as in Preparation Example 1-1 except that the raw materials were mixed to have a Fe:V:$PO_4$ mole ratio of 0.95:0.05:1.03.

Preparation Example 3-3

A positive active material having the following formula $LiFe_{0.95}V_{0.05}P_{1.06}O_4$ was prepared according to the same method as in Preparation Example 1-1 except that the raw materials were mixed to have a Fe:V:PO$_4$ mole ratio of 0.95:0.05:1.06.

Preparation Example 4-1

A positive active material having the following formula LiFe$_{0.93}$V$_{0.07}$PO$_4$ was prepared according to the same method as in Preparation Example 1-1 except that the raw materials were mixed to have a Fe:V:PO$_4$ mole ratio of 0.93:0.07:1.00.

Preparation Example 5-1

A positive active material having the following formula LiFe$_{0.91}$V$_{0.09}$PO$_4$ was prepared according to the same method as in Preparation Example 1-1 except that the raw materials were mixed to have a Fe:V:PO$_4$ mole ratio of 0.91:0.09:1.00.

Preparation Example 5-2

A positive active material having the following formula LiFe$_{0.91}$V$_{0.09}$P$_{1.03}$O$_4$ was prepared according to the same method as in Preparation Example 1-1 except that the raw materials were mixed to have a Fe:V:PO$_4$ mole ratio of 0.91:0.09:1.03.

Preparation Example 5-3

A positive active material having the following formula LiFe$_{0.91}$V$_{0.09}$P$_{1.06}$O$_4$ was prepared according to the same method as in Preparation Example 1-1 except that the raw materials were mixed to have a Fe:V:PO$_4$ mole ratio of 0.91:0.09:1.06.

Preparation Example 6-1

Li$_2$Co$_3$, FeC$_2$O$_4$-2H$_2$O$_2$, NH$_4$VO$_3$, Co(NO$_3$)$_2$, and (NH$_4$)$_2$HPO$_4$ were mixed in water and processed with a ball mill. Herein, the FeC$_2$O$_4$-2H$_2$O$_2$, NH$_4$VO$_3$, Co(NO$_3$)$_2$, and (NH$_4$)$_2$HPO$_4$ were mixed in a Fe:V:Co:PO$_4$ mole ratio of 0.95:0.05:0.01:1.00.

Next, the reactant was dried at 110° C. to remove a solvent remaining therein. Then, the resulting reactant was heat treated at 750° C. for 10 hours under a reduction atmosphere, obtaining a positive active material represented by the following formula

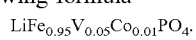
LiFe$_{0.95}$V$_{0.05}$Co$_{0.01}$PO$_4$.

Preparation Example 6-2

A positive active material having the following formula LiFe$_{0.925}$V$_{0.05}$Co$_{0.025}$PO$_4$ was prepared according to the same method as in Preparation Example 6-1 except that the raw materials were mixed to have a Fe:V:PO$_4$ mole ratio of 0.925:0.05:0.025:1.00.

Preparation Example 6-3

A positive active material having the following formula LiFe$_{0.90}$V$_{0.05}$Co$_{0.050}$PO$_4$ was prepared according to the same method as in Preparation Example 6-1 except that the raw materials were mixed to have a Fe:V:PO$_4$ mole ratio of 0.90:0.05:0.050:1.00.

Comparative Preparation Example

A positive active material having the following formula LiFePO$_4$ was prepared according to the same method as in Example 6-1 except that NH$_4$VO$_3$ and Co(NO$_3$)$_2$ were not included, and the (NH$_4$)$_2$HPO$_4$ and FeC$_2$O$_4$-2H$_2$O$_2$ were mixed to have a Fe:PO$_4$ mole ratio of 1:1.

BATTERY CELL FABRICATION

Example 1-1

A positive active material slurry was prepared by mixing 90 wt % of the positive active material according to Preparation Example 1-1, 5 wt % of carbon black, and 5 wt % of polyvinylidene fluoride in an N-methylpyrrolidone solvent. The positive active material slurry was coated on an aluminum foil into a thin substrate, dried at 120° C. for 1 hour, and compressed, fabricating a positive electrode.

A lithium metal foil was used as a counter electrode.

The positive electrode and the counter electrode were assembled with a 20 μm-thick polyethylene separator and an electrolyte solution (a mixture of ethylene carbonate (EC): ethylmethyl carbonate (EMC):dimethylcarbonate (DMC) 1:1:1(v/v/v)+1.15 M LiPF$_6$), fabricating a coin-type half-cell.

Example 1-2

A coin-type half-cell was fabricated according to the same method as in Example 1-1 except that the positive active material according to Preparation Example 1-2 was used instead of the positive active material according to Preparation Example 1-1.

Example 2-1

A coin-type half-cell was fabricated according to the same method as in Example 1-1 except that the positive active material according to Preparation Example 2-1 was used instead of the positive active material according to Preparation Example 1-1.

Example 3-1

A coin-type half-cell was fabricated according to the same method as in Example 1-1 except that the positive active material according to Preparation Example 3-1 was used instead of the positive active material according to Preparation Example 1-1.

Example 3-2

A coin-type half-cell was fabricated according to the same method as in Example 1-1 except that the positive active material according to Preparation Example 3-2 was used instead of the positive active material according to Preparation Example 1-1.

Example 3-3

A coin-type half-cell was fabricated according to the same method as in Example 1-1 except that the positive active material according to Preparation Example 3-3 was used instead of the positive active material according to Preparation Example 1-1.

Example 4-1

A coin-type half-cell was fabricated according to the same method as in Example 1-1 except that the positive active material according to Preparation Example 4-1 was used instead of the positive active material according to Preparation Example 1-1.

Example 5-1

A coin-type half-cell was fabricated according to the same method as in Example 1-1 except that the positive active material according to Preparation Example 5-1 was used instead of the positive active material according to Preparation Example 1.1.

Example 5-2

A coin-type half-cell was fabricated according to the same method as in Example 1-1 except that the positive active material according to Preparation Example 5-2 was used instead of the positive active material according to Preparation Example 1-1.

Example 5-3

A coin-type half-cell was fabricated according to the same method as in Example 1-1 except that the positive active material according to Preparation Example 5-3 was used instead of the positive active material according to Preparation Example 1-1.

Example 6-1

A coin-type half-cell was fabricated according to the same method as in Example 1-1 except that the positive active material according to Preparation Example 6-1 was used instead of the positive active material according to Preparation Example 1-1.

Example 6-2

A coin-type half-cell was fabricated according to the same method as in Example 1-1 except that the positive active material according to Preparation Example 6-2 was used instead of the positive active material according to Preparation Example 1-1.

Example 6-3

A coin-type half-cell was fabricated according to the same method as in Example 1-1 except that the positive active material according to Preparation Example 6-3 was used instead of the positive active material according to Preparation Example 1-1.

Comparative Example

A coin-type half-cell was fabricated according to the same method as in Example 1-1 except that the positive active material according to the Comparative Preparation Example was used instead of the positive active material according to Preparation Example 1-1.

Evaluation-1

The half-cells according to Examples 1-1 to 6-3 and Comparative Example were evaluated regarding charge and discharge characteristics.

The charge and discharge characteristics evaluation was performed at a cut-off voltage ranging from 2.0 V to 4.2 V and at a C-rate of 0.1 C, 0.2 C, 0.5 C, 1.0 C, 3.0 C, and 5.0 C.

The results are provided in Tables 1 and 2. Table 1 shows capacity per weight (gram), and Table 2 shows capacity per volume (cc).

TABLE 1

| | \multicolumn{5}{c}{$LiFe_{1-x-z}V_xCo_zP_yO_4$} | | Rate Capacity (capacity per gram) [mAh/g] | | | |
|---|---|---|---|---|---|---|---|---|---|
| | x | y | z | x/y | x/z | 0.1 C discharge | 1.0 C discharge | 3.0 C discharge | 5.0 C discharge |
| Comparative Example | 0 | 1.00 | 0 | 0 | 0 | 139.4 | 126.3 | 114.6 | 107.3 |
| Example 1-1 | 0.01 | 1.00 | 0 | 0.01 | — | 140.7 | 130.8 | 118.8 | 110.9 |
| Example 1-2 | 0.01 | 1.03 | 0 | 0.0097 | — | 151.6 | 131.8 | 119.3 | 112.1 |
| Example 2-1 | 0.03 | 1.00 | 0 | 0.03 | — | 161.7 | 138.7 | 127.8 | 121.5 |
| Example 3-1 | 0.05 | 1.00 | 0 | 0.05 | — | 155.5 | 141.2 | 133.5 | 128.9 |
| Example 3-2 | 0.05 | 1.03 | 0 | 0.048 | — | 145 | 141.3 | 133.5 | 126.7 |
| Example 3-3 | 0.05 | 1.06 | 0 | 0.047 | — | 137.2 | 132.7 | 123.1 | 116.9 |
| Example 4-1 | 0.07 | 1.00 | 0 | 0.07 | — | 142.9 | 140.9 | 136.5 | 132.9 |
| Example 5-1 | 0.09 | 1.00 | 0 | 0.09 | — | 142.0 | 140.5 | 137.1 | 134.0 |
| Example 5-2 | 0.09 | 1.03 | 0 | 0.087 | — | 141.2 | 139.9 | 136.7 | 131.1 |
| Example 5-3 | 0.09 | 1.06 | 0 | 0.085 | — | 134.4 | 133 | 129.5 | 124.6 |
| Example 6-1 | 0.05 | 1.00 | 0.01 | 0.05 | 5.00 | 152.5 | 140.9 | 133.6 | 127.9 |
| Example 6-2 | 0.05 | 1.00 | 0.025 | 0.05 | 2.00 | 151.9 | 139.8 | 133.1 | 127.8 |
| Example 6-3 | 0.05 | 1.00 | 0.050 | 0.05 | 1.00 | 142.2 | 127.8 | 121.8 | 118.5 |

TABLE 2

| | \multicolumn{5}{c}{$LiFe_{1-x-z}V_xCo_zP_yO_4$} | | Rate Capacity (capacity per cc) [mAh/g] | | | |
|---|---|---|---|---|---|---|---|---|---|
| | x | y | z | x/y | x/z | 0.1 C discharge | 1.0 C discharge | 3.0 C discharge | 5.0 C discharge |
| Comparative Example | 0 | 1.00 | 0 | 0 | 0 | 278.8 | 252.7 | 229.2 | 214.5 |
| Example 1-1 | 0.01 | 1.00 | 0 | 0.01 | — | 273.0 | 253.7 | 230.5 | 215.1 |
| Example 1-2 | 0.01 | 1.03 | 0 | 0.0097 | — | 304.7 | 264.9 | 239.8 | 225.3 |
| Example 2-1 | 0.03 | 1.00 | 0 | 0.03 | — | 318.5 | 273.2 | 251.8 | 239.4 |

TABLE 2-continued

| | LiFe$_{1-x-z}$V$_x$Co$_z$P$_y$O$_4$ | | | | | Rate Capacity (capacity per cc) [mAh/g] | | | |
|---|---|---|---|---|---|---|---|---|---|
| | x | y | z | x/y | x/z | 0.1 C discharge | 1.0 C discharge | 3.0 C discharge | 5.0 C discharge |
| Example 3-1 | 0.05 | 1.00 | 0 | 0.05 | — | 301.7 | 273.9 | 259.0 | 250.1 |
| Example 3-2 | 0.05 | 1.03 | 0 | 0.048 | — | 294.4 | 286.8 | 271.0 | 257.2 |
| Example 3-3 | 0.05 | 1.06 | 0 | 0.047 | — | 303.2 | 293.3 | 272.1 | 258.3 |
| Example 4-1 | 0.07 | 1.00 | 0 | 0.07 | — | 268.7 | 264.9 | 256.6 | 249.9 |
| Example 5-1 | 0.09 | 1.00 | 0 | 0.09 | — | 262.7 | 259.9 | 253.6 | 247.9 |
| Example 5-2 | 0.09 | 1.03 | 0 | 0.087 | — | 279.6 | 277.0 | 270.7 | 259.6 |
| Example 5-3 | 0.09 | 1.06 | 0 | 0.085 | — | 290.3 | 287.3 | 279.7 | 269.1 |
| Example 6-1 | 0.05 | 1.00 | 0.01 | 0.05 | 5.00 | 298.9 | 276.2 | 261.9 | 250.7 |
| Example 6-2 | 0.05 | 1.00 | 0.025 | 0.05 | 2.00 | 290.1 | 267.0 | 254.2 | 244.1 |
| Example 6-3 | 0.05 | 1.00 | 0.050 | 0.05 | 1.00 | 266.2 | 231.1 | 217.4 | 215.7 |

Referring to Tables 1 and 2, the cells according to Examples 1-1 to 6-3 had improved capacity characteristic compared with the cell according to the Comparative Example.

The cells had capacity characteristics varying according to a ratio (x/y) between vanadium (V) and phosphorus (P). In particular, the cells had very good capacity per weight and capacity per volume when 0.03≤x/y≤0.07 based on a 1.0 C discharge, and even better capacity per weight and capacity per volume when x/y was about 0.05 based on a 1.0 C discharge.

In addition, when the same amount of vanadium (V) is included in the cells, the capacity characteristics of the cells varied depending on the amount of phosphorus (P).

Evaluation-2

The half-cells according to Examples 1-1 to 6-3 were evaluated regarding cycle-life characteristics.

The cycle-life characteristics were evaluated by charging and discharging the cells at 1 C 50 times and calculating their capacity retentions (i.e., initial capacity/capacity after charging and discharging the cells at 1 C 50 times).

The results are provided in Table 3.

TABLE 3

| | LiFe$_{1-x-z}$V$_x$Co$_z$P$_y$O$_4$ | | | | | Capacity retention (cycle-life, %) |
|---|---|---|---|---|---|---|
| | x | y | z | x/y | x/z | 1 C, @ 50 cycles |
| Example 1-1 | 0.01 | 1.00 | 0 | 0.01 | — | 97.9 |
| Example 1-2 | 0.01 | 1.03 | 0 | 0.0097 | — | 97.8 |
| Example 2-1 | 0.03 | 1.00 | 0 | 0.03 | — | 96.8 |
| Example 3-1 | 0.05 | 1.00 | 0 | 0.05 | — | 96.2 |
| Example 3-2 | 0.05 | 1.03 | 0 | 0.048 | — | 96.4 |
| Example 3-3 | 0.05 | 1.06 | 0 | 0.047 | — | 95.9 |
| Example 4-1 | 0.07 | 1.00 | 0 | 0.07 | — | 94.3 |
| Example 5-1 | 0.09 | 1.00 | 0 | 0.09 | — | 92.5 |
| Example 5-2 | 0.09 | 1.03 | 0 | 0.087 | — | 92.3 |
| Example 5-3 | 0.09 | 1.06 | 0 | 0.085 | — | 91.8 |
| Example 6-1 | 0.05 | 1.00 | 0.01 | 0.05 | 5.00 | 97.1 |
| Example 6-2 | 0.05 | 1.00 | 0.025 | 0.05 | 2.00 | 99.6 |
| Example 6-3 | 0.05 | 1.00 | 0.050 | 0.05 | 1.00 | 98.9 |

Referring to Table 3, the cells according to Examples 1-1 to 6-3 had a capacity retention of greater than or equal to about 90%, thereby providing good cycle-life characteristics. In particular, when the cells include cobalt (Co), cycle-life characteristics were further improved. The highest cycle-life characteristics were observed when vanadium (V) and cobalt (Co) were included in a ratio (x/z) of 2.

Referring to Tables 1 to 3, cells including vanadium (V) and cobalt (Co) had improved capacity and cycle-life characteristics.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims and equivalents thereof.

What is claimed is:

1. A positive active material comprising a lithium-containing compound represented by the following Chemical Formula 1:

$$LiFe_{1-x-z}M_xM'_zP_yO_4 \qquad \text{Chemical Formula 1}$$

wherein, M is vanadium (V), M' is cobalt (Co), manganese (Mn), magnesium (Mg), zirconium (Zr), nickel (Ni), or a combination thereof, and about 0<x<about 0.20, about 0≤z<about 0.20, and about 0.90<y<about 1.20, wherein the lithium-containing compound comprises secondary particles formed of agglomerated primary particles, the secondary particles having a particle size in the range of about 5 μm to about 30 μm, and wherein x and z have a ratio of about 0.5≤x/z≤about 5.

2. The positive active material of claim 1, wherein x and y have a ratio of about 0.009≤x/y≤ about 0.07.

3. The positive active material of claim 1, wherein x and y have a ratio of about 0.03≤x/y≤ about 0.07.

4. The positive active material of claim 1, wherein x and y have an x/y ratio of about 0.05.

5. The positive active material of claim 1, wherein M is vanadium (V) and M' is cobalt (Co).

6. The positive active material of claim 1, wherein the lithium-containing compound is selected from the group consisting of LiFe$_{0.96}$V$_{0.05}$Co$_{0.01}$PO$_4$, LiFe$_{0.925}$V$_{0.05}$Co$_{0.025}$PO$_4$, LiFe$_{0.9}$V$_{0.05}$Co$_{0.05}$PO$_4$, and combinations thereof.

7. The positive active material of claim 1, wherein a particle size of the primary particles is in a range of about 50 nm to about 1000 nm.

8. The positive active material of claim 7, wherein the particle size of the primary particles is in a range of about 50 nm to about 200 nm.

9. A rechargeable lithium battery comprising a positive electrode comprising the positive active material according to claim 1, a negative electrode, and an electrolyte.

10. The positive active material of claim 1, wherein 1.03≤y< about 1.20.

11. The positive active material of claim 1, wherein x and y have a ratio of about 0.048≤x/y≤ about 0.07.

12. A positive active material comprising a lithium-containing compound represented by the following Chemical Formula 1:

$$LiFe_{1-x-z}M_xM'_zP_yO_4 \quad \text{Chemical Formula 1}$$

wherein, M is vanadium (V), M' is cobalt (Co), manganese (Mn), magnesium (Mg), zirconium (Zr), nickel (Ni), or a combination thereof, and about $0<x<$about 0.20, about $0\leq z<$about 0.20, and about $0.90<y<$about 1.20, wherein the lithium-containing compound comprises secondary particles formed of agglomerated primary particles, the secondary particles having a particle size in the range of about 5 μm to about 30 μm, and wherein x and z have an x/z ratio of about 2.

* * * * *

UNITED STATES PATENT AND TRADEMARK OFFICE
CERTIFICATE OF CORRECTION

PATENT NO. : 9,979,023 B2  
APPLICATION NO. : 13/602033  
DATED : May 22, 2018  
INVENTOR(S) : Jay-Hyok Song et al.

Page 1 of 1

It is certified that error appears in the above-identified patent and that said Letters Patent is hereby corrected as shown below:

In the Claims

Column 14, Line 35, Claim 1  delete "$0.90<y<$about" and insert -- $0.90\leq y<$about --

Column 15, Line 9, Claim 12  delete "$0.90<y<$about" and insert -- $0.90\leq y<$about --

Signed and Sealed this  
Twenty-third Day of July, 2019

Andrei Iancu  
*Director of the United States Patent and Trademark Office*